April 12, 1932.   H. TISCHNER ET AL   1,854,003
APPARATUS FOR TRANSFORMING VIBRATIONS INTO LIGHT VARIATIONS
Filed Jan. 5, 1931
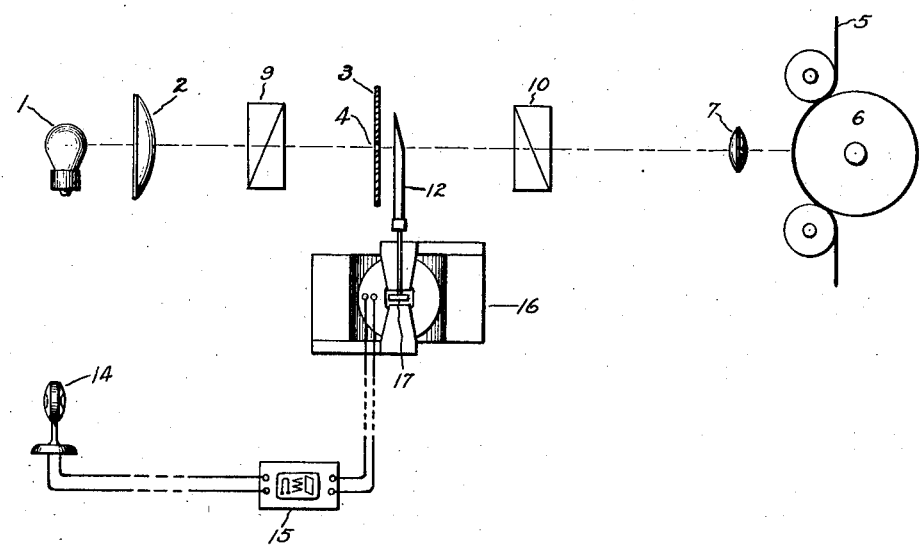
Inventors:
Horst Tischner,
Friedrich Klaiber,
by Charles E. Tullar
Their Attorney.

Patented Apr. 12, 1932

1,854,003

UNITED STATES PATENT OFFICE

HORST TISCHNER, OF HALENSEE-BERLIN, AND FRIEDRICH KLAIBER, OF REINICKEN-DORF-BERLIN, GERMANY, ASSIGNORS TO GENERAL ELECTRIC COMPANY, A CORPORATION OF NEW YORK

APPARATUS FOR TRANSFORMING VIBRATIONS INTO LIGHT VARIATIONS

Application filed January 5, 1931, Serial No. 506,822, and in Germany January 15, 1930.

Our invention relates to apparatus for transforming vibrations into light variations. It relates particularly to apparatus for making a photographic record of vibrations such for example as electric or sound vibrations, and it is the object of our invention to provide an improved form of apparatus of this character.

Our invention will be better understood from the following description taken in connection with the accompanying drawings, and its scope will be pointed out in the appended claims.

In the single figure of the drawing which illustrates an embodiment of our invention, light from the source 1 is concentrated by the lens 2 on the screen 3 in which is the narrow light slit or aperture 4. At the opposite side of the screen 3 is shown the light sensitive film 5 supported for uniform movement longitudinally thereof by the roller 6. Lens 7, such for example, as a microscope objective, produces a reduced image of the aperture 4 on the film, the aperture being transverse of the film. Arranged at opposite sides of the screen are the two light polarizing means 9 and 10 which for example may be Nicol prisms. Although not so illustrated in the drawing, these prisms are arranged with their respective planes of polarization substantially at right angles to each other. As so arranged none of the light from source 1 would reach the film. Close to the screen 3 is the member 12 of which that portion which is in the path of the light rays passing the aperture is tapered or wedgeshaped. Member 12 is constructed of doubly refracting material, such for example as quartz. The effect of such a member is to rotate the plane of polarization of the light passing through it, the amount of rotation depending upon the thickness of the member. Inasmuch as the end of the member is wedge-shaped, movement thereof in a longitudinal direction which is transverse to the aperture 4 results in a variation in the amount of light reaching the film. Hence, longitudinal vibratory movements of member 12 may be photographically recorded on the film 5. In the particular form of apparatus which I have illustrated the member 12 is vibrated in accordance with sound waves received by a distant sound pick-up device. Such a device is shown as the microphone 14 connected through the amplifier 15 with the electro-magnetic actuator 16 the movable element 17 of which is shown directly connected with the member 12. With such an apparatus sound waves received by the microphone may be recorded on the film 5.

We have chosen the particular embodiment described above as illustrative of our invention and it will be apparent that various other modifications may be made without departing from the spirit and scope of our invention which modifications we aim to cover by the appended claims.

What we claim as new and desire to secure by Letters Patent of the United States, is:—

1. Apparatus for transforming vibrations into light variations comprising a light source, a plurality of optically crossed light polarizing means arranged in the path of a light beam from said source, means between said polarizing means for limiting the size of the beam, and a tapering doubly refracting means which is located adjacent to said limiting means and is movable transversely of the beam in response to said vibrations.

2. Apparatus for transforming vibrations into light variations comprising a light source, a pair of optically crossed light polarizing members arranged in the path of a light beam from said source, a screen between said members having a narrow aperture therein, a tapering doubly refracting member adjacent said screen, and means for vibrating said latter member.

3. In apparatus for photographically recording vibrations comprising a light source and a light sensitive member, the combination of a pair of optically crossed light polarizing members between said source and said member, a screen between said polarizing members having a narrow aperture therein, a wedge-shaped doubly refracting member opposite said aperture, and means for imparting to said doubly refracting member the vibrations which are to be recorded.

4. In apparatus for photographically recording electrical vibrations comprising a light source and a light sensitive member, the combination of a pair of Nicol prisms between said source and said member and turned substantially at right angles to each other, a screen between the prisms having a narrow light opening therein, a quartz wedge adjacent said opening, and means for vibrating said wedge in response to said electrical vibrations.

5. Sound recording apparatus comprising a light source, a screen having therein a narrow aperture arranged to be illuminated by said source, a light sensitive member, means for imaging said aperture on said member, a pair of Nicol prisms arranged respectively at opposite sides of said screen and turned substantially at right angles to each other, a quartz wedge arranged over said aperture, a sound pick-up device, and an electromagnetic device connected therewith for vibrating said quartz wedge.

In witness whereof, we have hereunto set our hands this 13th day of December, 1930.

HORST TISCHNER.
FRIEDRICH KLAIBER.